United States Patent [19]

Wells et al.

[11] Patent Number: 5,621,949
[45] Date of Patent: Apr. 22, 1997

[54] BARBED CABLE TIE

[75] Inventors: Peter Wells, Germantown, Tenn.;
William A. Fortsch, Bernardsville, N.J.

[73] Assignee: Thomas & Betts Corproation,
Memphis, Tenn.

[21] Appl. No.: 418,339

[22] Filed: Apr. 7, 1995

[51] Int. Cl.[6] .................................................. B65D 63/00
[52] U.S. Cl. .................. 24/16 PB; 24/17 AP; 24/30.5 P
[58] Field of Search ........................... 24/16 PB, 17 AP, 24/17 A, 30.5 P

[56] References Cited

U.S. PATENT DOCUMENTS

| | | | |
|---|---|---|---|
| 3,102,311 | 9/1963 | Martin et al. | 24/16 |
| 3,186,047 | 6/1965 | Schwester et al. | 24/16 |
| 3,408,699 | 11/1968 | Reynolds | 24/16 |
| 3,416,198 | 12/1968 | Geisinger | 24/16 |
| 3,457,598 | 7/1969 | Mariani | 24/16 |
| 3,488,813 | 1/1970 | Kohke | 24/16 |
| 3,490,104 | 1/1970 | Kabel | 24/16 |
| 3,525,128 | 8/1970 | Hidassy | 24/73 |
| 3,530,544 | 9/1970 | Burniston | 24/16 |
| 3,556,575 | 1/1971 | Farkas | 292/307 |
| 3,568,262 | 3/1971 | Woldman | 24/73 |
| 3,588,961 | 6/1971 | Farago | 24/16 |
| 3,739,429 | 6/1973 | Kohke | 24/16 |
| 3,875,618 | 4/1975 | Schuplin | 24/16 |
| 3,892,011 | 7/1975 | Kohke | 24/16 |
| 3,965,538 | 6/1976 | Caveny et al. | 24/16 |
| 3,996,646 | 12/1976 | Caveney | 24/16 |
| 4,422,217 | 12/1983 | Berrette | 24/16 |
| 4,445,877 | 5/1984 | Love et al. | 474/225 |
| 4,498,507 | 2/1985 | Thompson | 140/93.2 |
| 4,653,155 | 3/1987 | Hara | 24/16 |
| 4,730,615 | 3/1988 | Sutherland et al. | 128/335 |
| 4,993,669 | 2/1991 | Dyer | 248/61 |
| 5,102,075 | 4/1992 | Dyer | 248/61 |
| 5,121,524 | 6/1992 | Mortensen | 24/16 |
| 5,193,251 | 3/1993 | Fortsch | 24/16 |

OTHER PUBLICATIONS

Thomas & Betts Catalog, "Electrical Components, Products and Systems", Front Cover, Back Cover and p. 1184, (3 pages), 1994.
Panduit Corporation "BARB-TY Cable Tie Features/Benefits", 4 pages, 1993.

*Primary Examiner*—Victor N. Sakran
*Attorney, Agent, or Firm*—Michael L. Hoelter; Salvatore J. Abbruzzese

[57] ABSTRACT

A cable tie includes a head having an elongate passage therethrough and a strap insertable into the head. The head includes a metallic barb supported therein which extends into the passage for locking engagement with the strap. The barb includes a portion embedded into the head and a portion extending therefrom. A cable tie exhibiting high withdrawal or pull-out strength with low strap insertion force is obtained by significantly increasing the length of the unembedded portion of the barb with respect to both the embedded portion and the thickness of the strap.

16 Claims, 4 Drawing Sheets

BARBED CABLE TIE

FIELD OF THE INVENTION:

The present invention relates generally to ties used to bundle an article or a group of articles. More particularly the present invention relates to an improved cable tie having a metallic barb mounted in the head of the cable tie for locking engagement with the cable tie strap.

BACKGROUND OF THE INVENTION:

Cable ties are well known devices used to bundle or secure a group of articles such as electrical wires or cables. U.S. Pat. No. 3,102,311 is an early example of ties used for such purposes.

Cable ties of conventional construction include a cable tie head, a longitudinal strap extending from the head and a tail at the opposite end of the strap. The strap is wrapped around a bundle of articles and the tail is inserted through an aperture or passage in the head. The head of the cable tie typically supports a locking element which extends into the head passage and which is engagable with the body of the strap upon insertion into the head passage so that when the tail is pulled through the head passage, the locking element secures the strap body in the head.

Advances in cable tie construction have taken many forms and shapes. Many of these advances have been in the area of the locking element carried in the cable tie head to secure the strap therein.

The art has seen the use of flexible locking elements which are integrally molded with the head. One example of such a tie is U.S. Pat. No. 3,965,538. Also, ties have been developed employing metallic barbs embedded into the head which serve as the locking element. One example of a metallic barb tie is U.S. Pat. No. 3,186,047.

The metallic barb cable ties have been long known to exhibit exceptional pull-out performance in that the barb securely bites into the strap locking the strap in place in the head. Such metallic barb ties include the barb being embedded into the cable tie head at an acute angle with respect to the inserted tail. An end of the barb extends into the head passage and engages the strap upon insertion thereinto. Due in part to the bending characteristics of the barb as well as the angle at which it is embedded, the metal barb permits insertion of the cable tie strap through the head aperture. Upon an attempt to withdraw the strap in a direction opposite the insertion direction, the barb end bites into the strap, preventing such withdrawal. In addition to the '047 patent, other examples of cable ties having such construction are shown and described in U.S. Pat. Nos. 3,488,813 and 3,457,598.

As the metal barb of the cable tie actually bites into the inserted strap body in order to prevent withdrawal, cable ties of this type of construction exhibit high long-term pull-out resistance. This results in the cable tie having good tensile strength when coiled around a bundle (loop tensile strength) after aging. This is an important criteria in the selection and use of cable ties. However one perceived disadvantage of metallic barb cable ties is that the tie exhibits relatively high strap insertion forces. As the metallic barb must be deflected to permit insertion of the strap, the force necessary to deflect the barb must be overcome. This force can be even more significant in larger sized cable ties.

The cable tie art has seen attempts to construct cable ties which would have the pull-out strength of a cable tie having an embedded metallic barb while still exhibiting low insertion force. One such attempt is a multiple piece cable tie such as shown in U.S. Pat. No. 5,121,524 where the cable tie is formed to have a head including a hingedly mounted pawl which holds a metallic barb therein. The pawl is flexibly rotatably movable within the head upon insertion of the strap. The metal barb supported by the pawl bites into the strap upon attempted withdrawal of the strap. A further example is also shown in U.S. Pat. No. 5,193,251 where the head of the cable tie includes a metallic barb supported on a cantilevered platform. The platform is deflectable upon insertion of the strap through the aperture to permit ease of passage therethrough. The barb is positioned for biting insertion into the strap upon an attempt to withdraw the strap from the aperture. While the cable ties shown in each of these patents provide, to some degree, the above noted features, such multi-component ties are more difficult to manufacture as the tie head must form a flexible pawl or platform which must securely retain the barb.

A still further attempt to decrease the insertion force necessary to insert the strap into the cable tie head is to embed the barb into the plastic of the head at a high angle. Cable ties of this design are manufactured by the assignee herein as well as by Panduit Corp. However, it has been found that this type of tie is difficult to construct as barb support at such an angle may be difficult to economically manufacture.

There thus still exists a need to provide a cable tie which exhibits high long-term loop tensile strength as well as low strap insertion force and which may be manufactured in an economical fashion.

SUMMARY OF THE INVENTION:

It is an object of the present invention to provide an improved cable tie of the type including an elongate strap, a head at one end thereof and a metallic locking barb embedded in the head for securing the strap in the head.

It is a further object of the present invention to provide a cable tie having a metallic barb embedded in the head of the cable tie in a manner which facilitates easy insertion of the strap into the head and which prevents withdrawal of the strap from the head.

It is a still further object of the present invention to provide a cable tie having a metallic barb which is embeddedly supported in the head of the cable tie and includes an unembedded barb extent extending therefrom which facilitates easy insertion of the strap in the head while preventing withdrawal thereof.

In the efficient attainment of these and other objects the present invention provides a cable tie including an elongate strap having a given strap thickness. The cable tie further includes a head having an elongate passage therethrough for insertable receipt of the strap. The head includes a barb support surface spaced from the passage. An elongate locking barb is supported by the head having a first end portion embedded into said barb support surface, an intermediate unembedded portion extending from said first end portion and a second end portion extending into the passage for locking engagement with this strap. The intermediate unembedded portion of the barb spans a transverse extent, substantially perpendicular to the head passage, which exceeds 1.9 times the given strap thickness.

In addition, the overall length of the metallic barb exceeds about 5.3 times the length of the embedded portion thereof. The barb so formed exhibits enhanced deflectability thereby resulting in lower strap insertion force.

3

As shown by way of the preferred embodiment herein, the present invention provides a metallic barb embedded in the head. The barb has a transverse unembedded portion which exceeds about 2 times the strap thickness. Further, the barb is embedded in the head so that it extends at an angle of about between 32° and 55° more preferably between 36° and 52° with respect to the strap.

Figure 1:
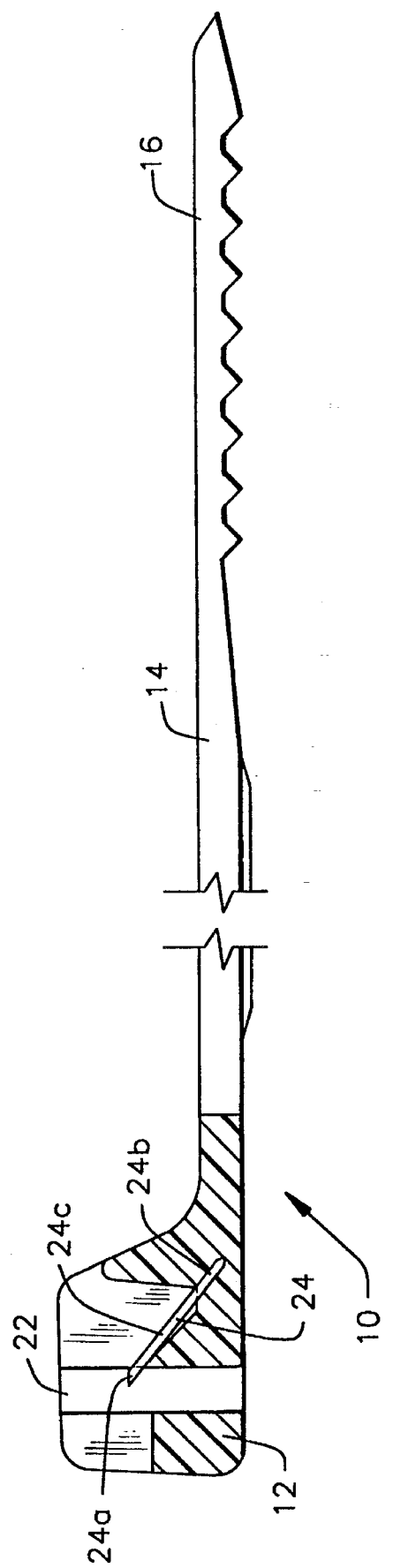
FIG. 1 is a side view, partially in section, of a cable tie of the present invention.

DETAILED DESCRIPTION OF THE PREFERRED EMBODIMENTS:

Referring to FIG. 1, a cable tie 10 of the present invention is shown. Cable tie 10 is typically an elongate molded plastic member which is used in a manner well known in the art to wrap around a bundle of articles such as electrical wire or cable (not shown). Cable tie 10 may be molded from a high strength plastic such as nylon or polypropylene and is suitable for both indoor and outdoor use. Cable tie 10 has a head 12 at one end thereof, a depending strap 14 extending from head 12 and a tail 16 at the end opposite of head 12. In the present illustrative embodiment, head 12 is formed as an integral portion of cable tie 10. However, in certain applications cable tie 10 may be constructed in a manner where head 12 is formed separately from strap 14.

Figure 3:
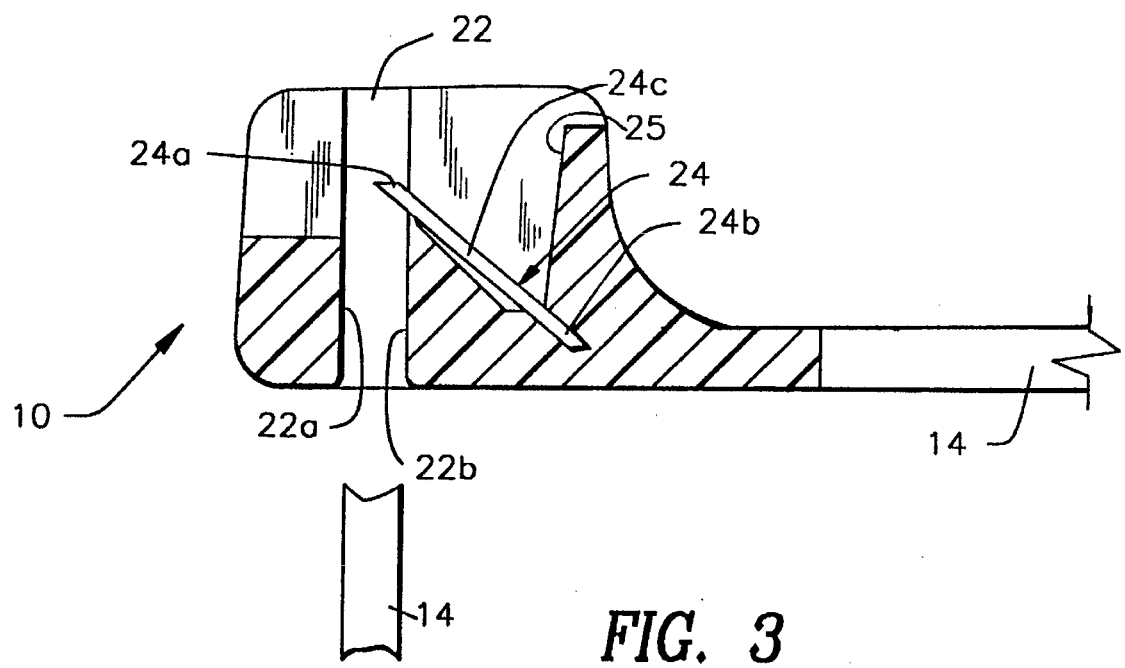
FIGS. 3 and 4 are cross-sectional showings of the head of two embodiments of a cable tie of the present invention.
Figure 4:
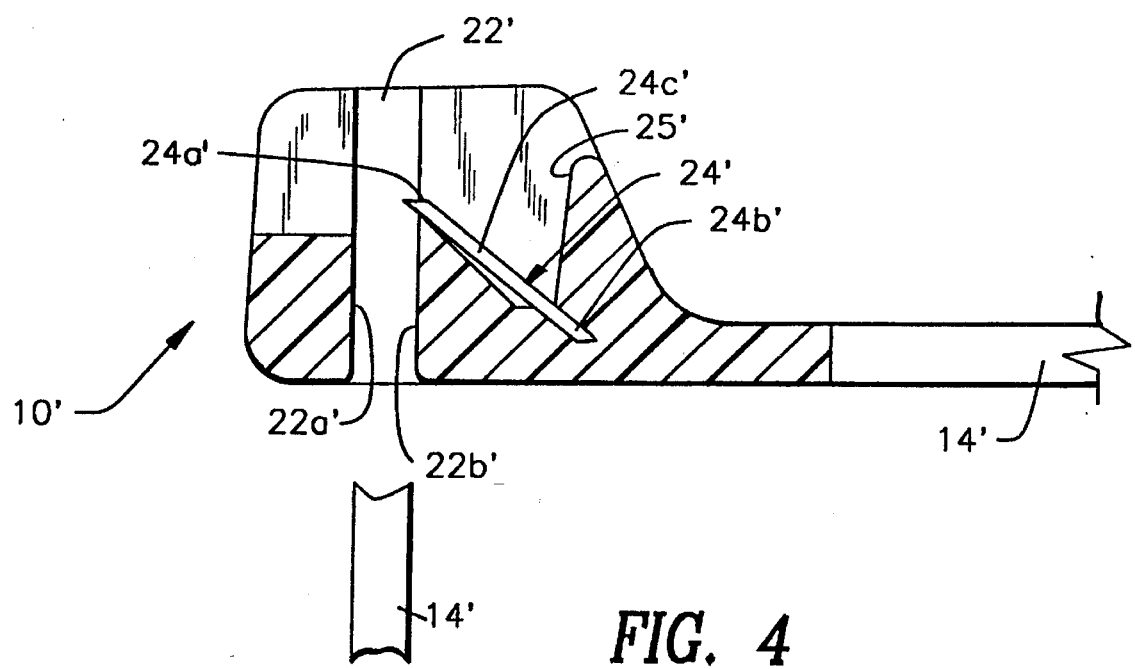
Figure 6:
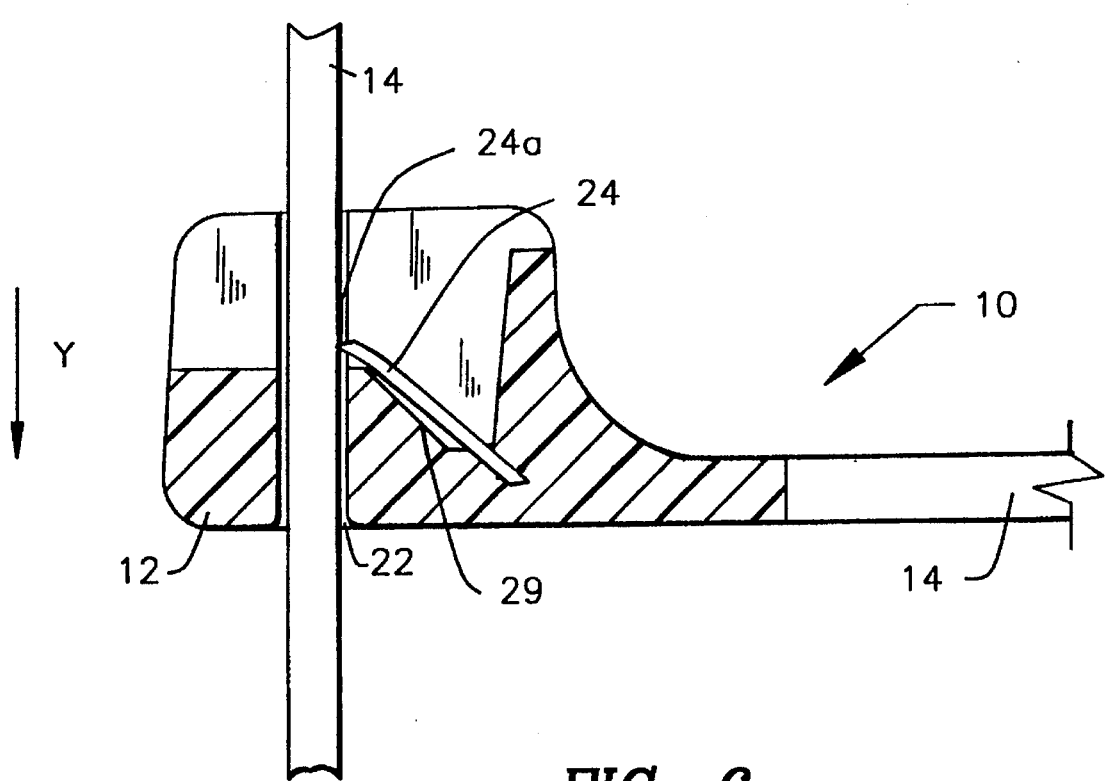

With additional reference to FIGS. 3 and 6 the details of the cable tie 10 of the present invention may be described. The embodiments shown in FIGS. 3 and 4 are substantially similar and are designed to accommodate different bundle or cable sizes. The FIG. 3 embodiment is referred to as a "120 lb. tie" while the FIG. 4 embodiment is referred to as a "50 lb. tie". Similar reference numerals will be used to represent similar components. The FIG. 4 embodiment will be described with reference numerals bearing the "prime" designation.

Head 12 of cable tie 10 includes an elongate central passage 22 therethrough which insertably accommodates tail 16 and strap 14 therein. Central passage 22 is defined by opposed upper and lower walls 22a and 22b between which tail 16 may be inserted. Spaced from passage 22, head 12 includes a planar surface 25 extending generally parallel to passage 22. Cable tie 10 further includes a metallic locking barb 24 embedded in head 12 at an acute angle with respect to an insertion axis 22c of the elongate passage 22. Barb 24 is positioned to engage strap 14 after it has been coiled around the bundle of articles and inserted into passage 22 to lock strap 14 in place around the bundle. The barb 24 is a metallic member, preferably formed of stainless steel and includes a knife-like strap engagement end portion 24a extending into passage 22. The barb 24 further includes an opposed embedded end portion 24b which is embedded into planar surface 25. An intermediate unembedded portion 24c of barb 24 extends between ends 24a and 24b. Barb 24 is deflectable to permit slidable, frictional insertion of said strap into said passage.

4

As mentioned above, cable tie 10' of FIG. 4 similarly includes a head 12', an elongate passage 22' therethrough and a strap 14' extending therefrom. Barb 24' is supported in head 12' in a manner similar to that shown and described above with respect to FIG. 3.

The present invention provides a cable tie construction which exhibits acceptable pull-out strength while achieving a reduction in the force necessary to insert the strap through the passage. This has been achieved by effectively increasing the unembedded length of the barb relative to the depth of embeddement of the barb while maintaining an appropriate barb angle with respect to the passage. The construction of the cable tie of the present invention and the improvement over more conventional prior art barbed cable ties is described with reference to FIG. 2 where schematically shown, is a cross-sectional view of a cable tie head including an embedded metallic barb.

Cable tie 110 includes a head 112 and an extending strap 114. Head 112 includes an elongate passage 122 extending therethrough. Passage 122 is defined by opposed upper and lower walls 122a and 122b and insertably accommodates therebetween strap 114 along insertion axis 122c. Head 112 includes a planar surface 125 generally parallel to and spaced from passage 122. Cable tie 110 head supports a locking barb 124 which is embedded into planar surface 125 at an angle with respect to passage 122. Locking barb 124 includes a strap engagement end portion 124a extending into passage 122, an opposed embedded end portion 124b which is embedded into planar surface 125 and an intermediate unembedded portion 124c between ends 124a and 124b.

Figure 2:
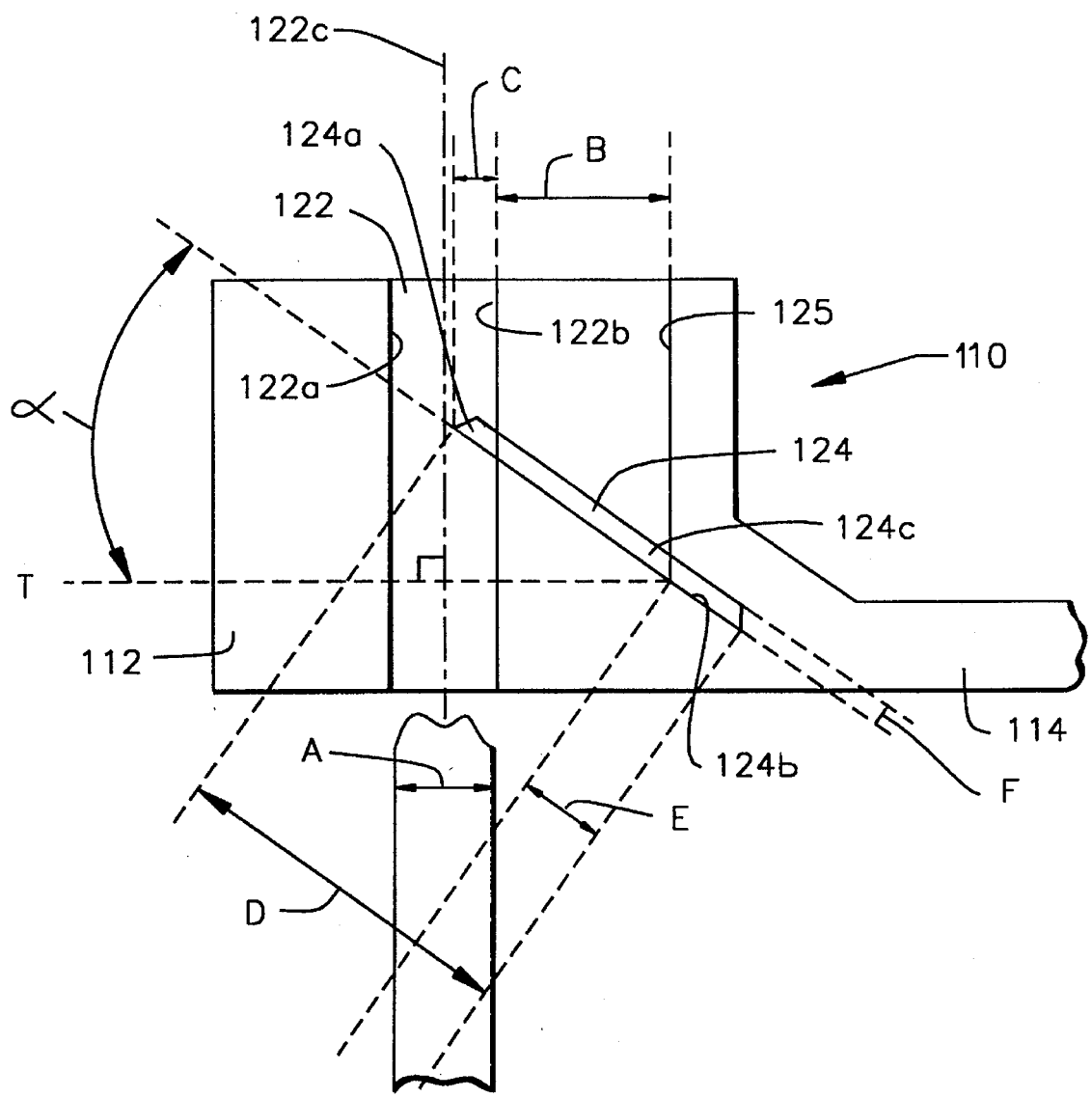
FIG. 2 is a schematic representation of a cable tie, which sets forth the dimensional relationship of the components thereof.

Barb 124, as shown in FIG. 2, may have an overall length "D" with embedded end portion 124b having a length "E" which is the depth that the barb 124 is embedded into planar surface 125 as measured along the barb. In addition, barb 124 includes strap engagement end portion 124a extending into passage 122 a distance "C" as measured along a transverse line "T" which is substantially perpendicular to the insertion axis 122c of strap 114. Intermediate portion 124c of barb 124 has an expanse "B" measured along transverse line "T". Furthermore, cable tie 110 includes strap 114 having a transverse thickness "A" measured along transverse line "T" as strap 114 is inserted into passage 122. Additionally, barb 124 is embedded into planar surface 125 at an angle "α" with respect to transverse line "T".

Prior attempts to construct cable ties which have acceptable pull-out or loop tensile strength have been achieved by substantially embedding the barb into planar surface 125 so as to make the overall barb relatively stiff thereby assuring that the barb bites into the strap and prevents withdrawal of the strap 114 from passage 122. TABLE I shows the design dimensions of both a 50 lb. cable tie and a 120 lb. cable tie of the prior art. Such construction exhibits superior pull-out or loop tensile strength (withdrawal force). It should be understood that these dimensions are nominal dimensions to which the cable ties are designed. The actual dimensions may vary due to manufacturing tolerances, plastic shrinkage and other factors.

TABLE I

|  | SAMPLE 1 (50 Lb. Tie) | SAMPLE 2 (120 Lb. Tie) |
| --- | --- | --- |
| A (in.) | .040 | .055 |

TABLE I-continued

|  | SAMPLE 1 (50 Lb. Tie) | SAMPLE 2 (120 Lb. Tie) |
| --- | --- | --- |
| B (in.) | .073 | .086 |
| C (in.) | .025 | .028 |
| D (in.) | .155 | .215 |
| E (in.) | .045 | .088 |
| F (in.) | .010 | .017 |
| α | 37° | 37° |
| Insertion Force (lbs.) | 2.0 | 8.0 |
| Withdrawal Force (lbs.) | 65.0 | 200.0 |
| B ÷ A | 1.825 | 1.563 |
| D ÷ E | 3.444 | 2.443 |

As can be seen from the above TABLE, while superior pull-out or withdrawal strength is achieved, the force required to insert the strap into the passage has been found to be sufficiently high so as to make repetitive installations difficult for the installer. One significant factor which yields such a high insertion force is the stiffness of the barb due to the ratio between the embedded and unembedded barb extents. In SAMPLES 1 and 2 above, the ratio of the unembedded intermediate barb length "B" to the strap thickness "A" measured along line "T" is less than 1.9:1 (B÷A). Thus the unembedded barb extent does not greatly exceed the thickness of the strap which engages it. Further, the ratio of the overall barb length "D" to the depth of barb embeddement "E" is less than 3.5:1 (D÷E). Such construction results in a "stiffer" barb requiring a high amount of force to cause the required barb deflection so as to allow the strap to be inserted through the passage.

Attempts have been made to modify the dimensional relationship of the barb, the cable tie head and the strap. One commercially available series of cable ties achieves lower insertion forces using the dimensional criteria as substantially set forth in TABLE II. These cable ties increase the barb angle α and also reduce the depth "E" of embeddement of the barb. Again, the nominal design dimensions are depicted. Actual dimension of the barb as manufactured and used may vary.

TABLE II

|  | SAMPLE 3 (50 Lb. Tie) | SAMPLE 4 (120 Lb. Tie) |
| --- | --- | --- |
| A (in.) | .042 | .060 |
| B (in.) | .073 | .086 |
| C (in.) | .025 | .028 |
| D (in.) | .158 | .210 |
| E (in.) | .035 | .040 |
| F (in.) | .010 | .017 |
| α | 45° | 50° |
| Insertion Force (lbs.) | 1.40 | 3.4 |
| Withdrawal Force (lbs.) | 72.5 | 216.0 |
| B ÷ A | 1.738 | 1.433 |
| D ÷ E | 4.514 | 5.250 |

As can be seen from TABLE II, a decrease in the insertion force is noted. However, one factor affecting the insertion force is the angle α of the barb. In the example in TABLE II, the cable tie is designed to have the barb positioned at approximately between 45° and 50°, which is greater than the about 37° of the barb of the samples of TABLE I. The positioning of a barb at such an angle may be difficult to achieve and maintain during use. Further, while the depth of barb embedment "E" is reduced there is no increase in the unembedded barb length "B".

TABLE II also shows that the ratio of the intermediate unembedded barb length "B" to strap thickness "A" is still less than 1.9:1 (B÷A). Also, the ratio of overall barb length "D" to the depth of barb penetration "E" is less than 5.3:1 (D÷E). Even though the depth of penetration "E" has been decreased, the ratio D:E is still relatively low as there is no increase in the length of the barb extents "B" and "D".

With additional reference to FIGS. 3–6, the advantages of the cable tie of the present invention are shown. The present invention achieves a decrease in the force necessary to insert the strap into the passage while still maintaining a high degree of loop tensile or pull-out strength. This is achieved without need to increase the angle of the barb in the head, as is necessary with the ties set forth in TABLE II.

In the present invention, such benefits are achieved by significantly increasing the ratio of the transverse expanse of the unembedded intermediate portion of the barb with respect to the thickness of the strap inserted into the passage. Further, the overall length of the barb is increased with respect to the depth of penetration of the embedded end portion of the barb into the planar support surface of the head. This results in a barb which is less stiff, i.e. is deflectable to the same extent as SAMPLES 1 and 2 of TABLE I, upon application of a lesser force.

With reference to TABLE III, the design dimensional criteria of the cable ties of the present invention are shown.

TABLE III

|  | SAMPLE 5 (50 Lb. Tie) | SAMPLE 6 (120 Lb. Tie) |
| --- | --- | --- |
| A (in.) | .040 | .060 |
| B (in.) | .112 | .129 |
| C (in.) | .025 | .027 |
| D (in.) | .195 | .240 |
| E (in.) | .032 | .040 |
| F (in.) | .012 | .017 |
| α | 37° | 37° |
| Insertion Force (lbs.) | 1.07 | 3.76 |
| Withdrawal Force (lbs.) | 78.0 | 212.0 |
| B ÷ A | 2.800 | 2.150 |
| D ÷ E | 6.093 | 6.000 |

As can be seen from TABLE III, the cable ties of the present invention exhibit a significant reduction in the force required to insert the strap into the passage as compared respectively with SAMPLES 1 and 2 of TABLE I. This low insertion force is achieved without reducing the pull-out or withdrawal force of the tie. As will be shown in further detail hereinbelow, such results are achieved by significantly increasing the ratio of the unembedded barb expanse "B" with respect to the strap thickness "A". In the present invention such ratio (B÷A) exceeds 2.0:1. Also, the construction of the present invention results in a barb having an overall length "D" and an embedded length "E" having a ratio (D÷E) of in excess of at least 6:1. The construction also maintains the barb angle of approximately 37° resulting in manufacturing efficiency.

Figure 5:
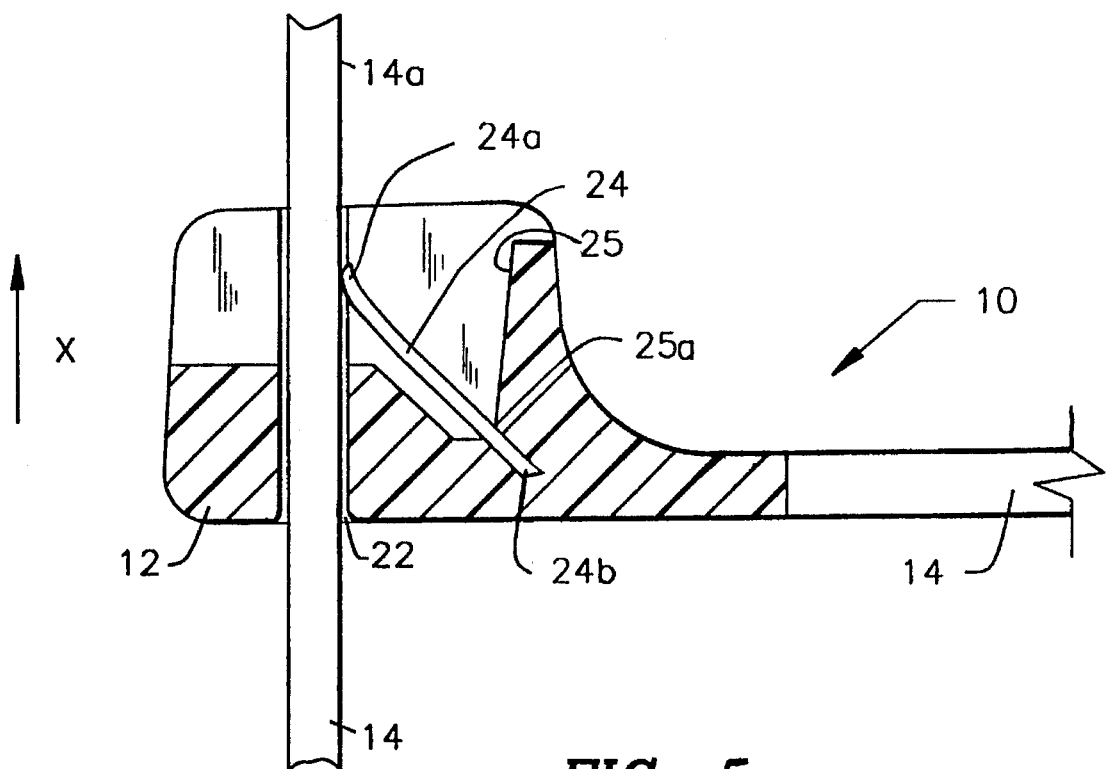
FIGS. 5 and 6 are cross-sectional views of the head of the cable tie of FIG. 3 shown in both the insertion position and withdrawal position, respectively with the deflection of the barb exaggerated for clarity.

With specific reference to FIGS. 5 and 6, the operation of the cable tie of the present invention may be described. Such description is being made with reference to the 120 lb. tie of FIG. 3 it being understood that the 50 lb. tie of FIG. 4 operates in a similar fashion. Upon insertion of strap 14 into passage 22 as shown in FIG. 5 in the insertion direction "X", one strap surface 14a engages knife-like end portion 24a of barb 24. Insertion of the strap 14 causes deflection of elongate barb 24 at location 25a of planar support surface 25. This causes the barb 24 to deflect so that the end portion 24a substantially clears passage 22 permitting continued insertion of strap 14 thereinto. In addition to the deflection of the beam forming barb 24, as the barb is embedded into plastic surface 25, the plastic material about location 25a deforms slightly causing movement of embedded portion 24b thereat. The present invention takes further advantage of this effect by increasing the length of the unembedded portion of the barb with respect to the embedded portion. Thus, in addition to achieving beam deflection, the construction of the cable tie of the present invention also provides for movement of the embedded portion of the barb within the plastic material supporting the barb thereby reducing the force necessary to move the barb and accordingly reducing the insertion force. This feature is more pronounced in larger sized cable ties such as the 120 lb. cable tie where the barb itself is less flexible.

Insertion of the strap in the direction "X" continues until the strap is fully inserted and tightened around the articles (not shown) to be bundled. Knife-like end portion 24a maintains engagement with strap surface 14a such that on an attempt to withdraw the strap as shown in FIG. 6 in a direction of arrow "Y" knife-like end portion 24a bites into strap 14 preventing such withdrawal. In order to prevent overdeflection of barb 24 in a direction of arrow "Y", cable tie head 10 includes a barb stop surface 29 engagable with barb 24.

A further benefit of the present invention is that in certain constructions and for certain sized cable ties, the thickness of the barb "F" may be increased without significantly increasing the strap insertion force. Such increase in barb thickness results in an increase in the withdrawal strength of the barb.

For any given cable tie, the amount of barb deflection is constant, that is the barb must deflect a sufficient amount to substantially clear passage 22 allowing strap insertion. Deflection of a simple cantilevered beam follows the equation:

$$\delta = \frac{Wl^3}{3EI}$$

where $\delta$ is deflection, W is the force or load, 1 is the unsupported beam length, E is the modulus of elasticity of the barb, and I is the moment of inertia. Further, $$I = \frac{1}{12} ; bh^3,$$

where h is the thickness of the beam. It may be appreciated that minimal increase in the barb thickness (F in FIG. 2) will have little impact upon W, the force or load required to achieve a constant deflection $\delta$. As the length 1 is increased in the above equation, the force W may be greatly reduced to maintain the same deflection $\delta$. An associated minimal increase in h will not cause a significant increase in W as the substantial increase in length 1, which is cubed in the above equation, would control.

Referring to the sample shown in the above TABLES, the thickness of the barb of the prior art 50 lb. cable ties (Samples 1 and 3) is about 0.010 in. where the strap thickness is between 0.040 in. and 0.042 in. The present invention provides for a barb having a greater thickness (0.012 in.) with a similar strap thickness (0.040) while still achieving low insertion forces. With the 50 lb. cable tie, the present invention permits the ratio of the strap thickness to the barb thickness to be below 4:1. More specifically the present invention achieves a ratio of 3.3:1. Accordingly, as the unembedded length of the barb (D–E) is increased approximately 47%, the minimal increase in barb thickness of 20% does not significantly impact W in the above equation.

Various changes to the foregoing described and shown structures would now be evident to those skilled in the art. Accordingly, the particularly disclosed scope of the invention is set forth in the following claims.

What is claimed is:

1. A cable tie comprising:

an elongate cable tie strap having a given strap thickness;

a cable tie head including an elongate passage therethrough adapted to insertably receive said strap therein, said passage defining a cable insertion axis, said head including a barb support surface spaced from said passage;

an elongate barb having a first end portion embedded into said barb support surface, an intermediate portion extending from said first end portion and a second end portion opposite said first end portion extending into said passage for locking engagement with said strap, said intermediate portion of said barb spanning a transverse extent as measured substantially perpendicular to said cable insertion axis exceeding 1.9 times said strap thickness.

2. A cable tie of claim 1 wherein said barb extends from said barb support surface at an acute angle with respect to said transverse extent.

3. A cable tie of claim 2 wherein said acute angle is less than about 55°.

4. A cable tie of claim 1 wherein said acute angle is between about 36° and 52°.

5. A cable tie of claim 4 wherein said acute angle is about 37°.

6. A cable tie of claim 1 wherein said intermediate portion of said barb is deflectably movable upon insertion of said strap through said passage.

7. A cable tie of claim 6 wherein said barb support surface is deformed about said embedded portion of said barb upon deflectable movement of said intermediate portion of said barb.

8. A cable tie of claim 1 wherein said transverse length is about 2.0 times said given strap thickness.

9. A cable tie of claim 1 wherein said barb has a given overall barb length including said first end portion, said second end portion and said intermediate portion.

10. A cable tie of claim 1 wherein said given overall barb length exceeds about 5.3 times the length of the embedded first end portion.

11. A cable tie of claim 1 wherein said given overall barb length is about 6.0 times the length of the embedded first portion.

12. A cable tie comprising:

an elongate cable tie strap;

a cable tie head including an elongate passage through which said strap is insertably received, said head having a barb support surface spaced from said passage;

an elongate locking barb having a first end embedded into said barb support surface and a second end extending into said passage for locking engagement with said inserted strap; and said first end of said strap being embedded into said barb support surface a given distance and said barb having an overall barb length which is greater than 5.3 times the given embedded distance of said first end.

13. A cable tie of claim 12 wherein said overall barb length is about 6.0 times the given embedded distance of said first end.

14. A cable tie of claim 12 wherein said barb includes an intermediate extent between said first end and said second end said intermediate extent having a transverse expanse measured along a line perpendicular to said elongate passage and wherein said strap has a given strap thickness, said transverse expanse of said intermediate barb extent exceeding about 1.9 times said given strap thickness.

15. A cable tie of claim 14 wherein said given strap thickness is about 0.040 in. and wherein said barb has a thickness greater than about 0.010 inches.

16. A cable tie comprising:

an elongate cable tie strap having a given strap thickness;

a cable tie head including an elongate passage therethrough adapted to insertably receive said strap therein, said passage defining a cable insertion axis, said head including a barb support surface spaced from said passage;

an elongate barb having a first end portion embedded into said barb support surface, an intermediate portion extending from said first end portion and a second end portion opposite said first end portion extending into said passage for locking engagement with said strap, said intermediate portion of said barb spanning a transverse extent, as measured substantially perpendicular to said cable insertion axis exceeding about 1.9 times said strap thickness; and wherein said given overall barb length exceeds 5.3 times the length of the embedded first end portion; and wherein said barb extends from said barb support surface at an acute angle of about 37°.

* * * * *